March 5, 1968  D. SCARAMUCCI  3,371,907
FLEXIBLE BALL VALVE SEALS
Filed Sept. 27, 1965  3 Sheets-Sheet 1
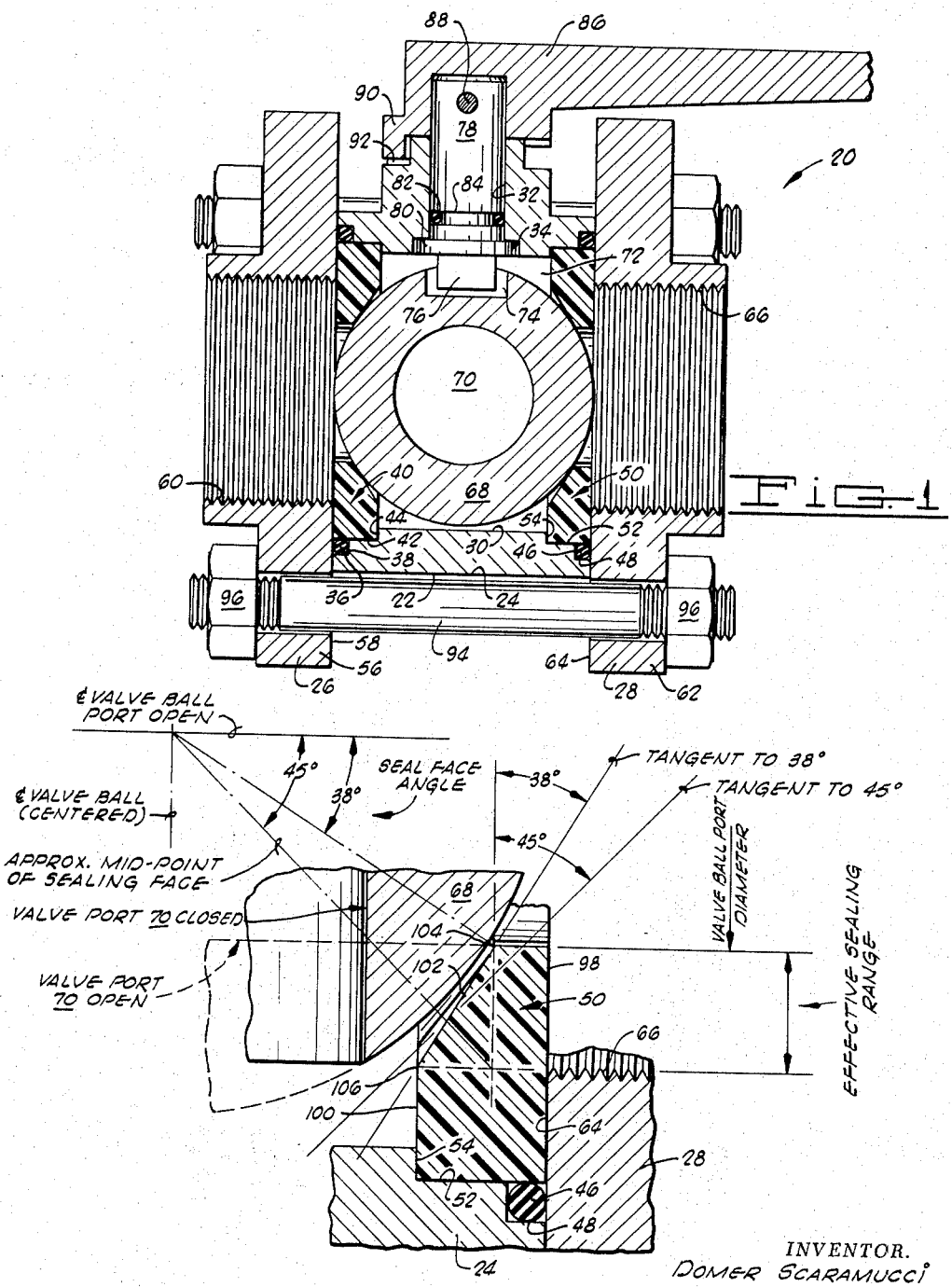
INVENTOR.
DOMER SCARAMUCCI
BY
Dunlap and Laney
ATTORNEYS

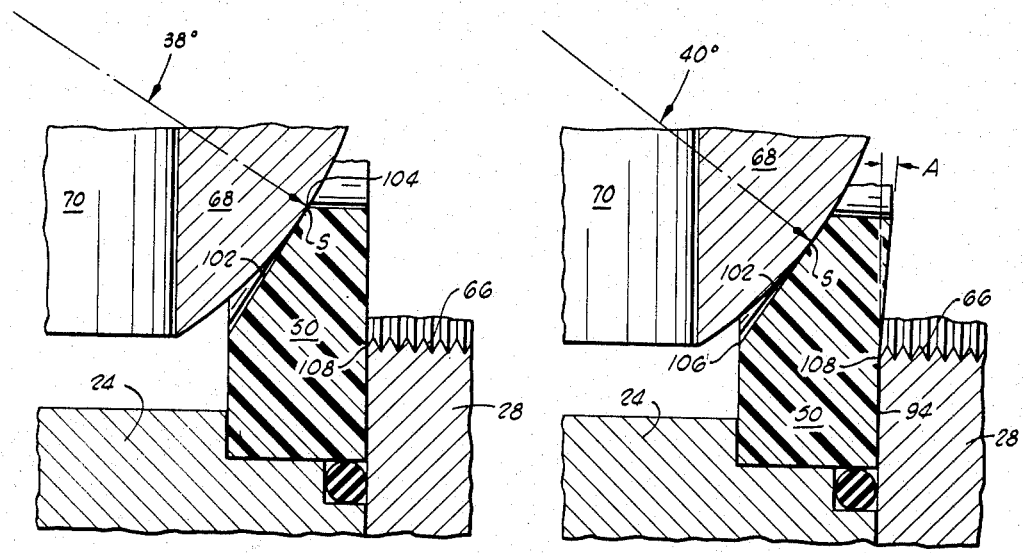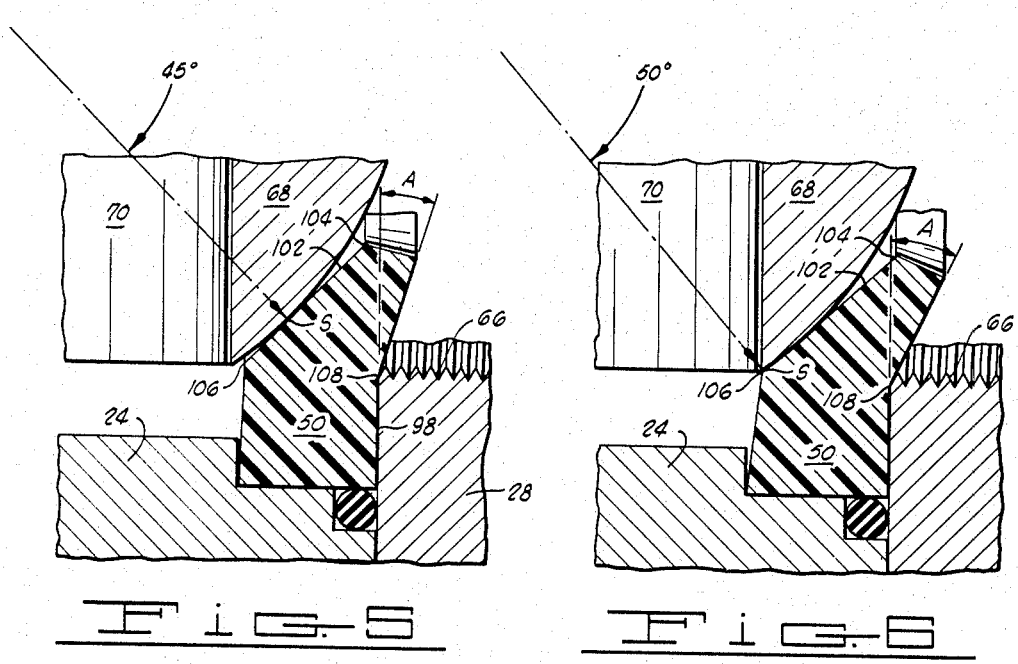

March 5, 1968  D. SCARAMUCCI  3,371,907
FLEXIBLE BALL VALVE SEALS
Filed Sept. 27, 1965  3 Sheets-Sheet 3

INVENTOR.
DOMER SCARAMUCCI
BY
Dunlap and Laney
ATTORNEYS

United States Patent Office 3,371,907
Patented Mar. 5, 1968

3,371,907
FLEXIBLE BALL VALVE SEALS
Domer Scaramucci, 3245 S. Hattie,
Oklahoma City, Okla. 73129
Filed Sept. 27, 1965, Ser. No. 490,354
16 Claims. (Cl. 251—175)

ABSTRACT OF THE DISCLOSURE

A ball valve having an annular seal in the downstream end of the valve chamber formed of an elastomer. The inner diameter of the seal is less than the diameter of the valve outlet, and the seal is anchored at its outer periphery in the valve chamber, whereby the seal is deflected into the outlet as the valve ball moves downstream to minimize the degree of contact between the valve ball and seal and minimize the force required to open and close the valve.

---

This invention relates generally to improved ball valves. More particularly, but not by way of limitation, this invention relates to an improved flexible seal for use in a ball valve.

Annular seals constructed from an elastic or resilient material have been used in ball valves in the past. However, the seals previously used have generally been positioned in the valve with a portion of the valve body or a rigid reinforcing member fully supporting the seals against the force exerted thereon by the valve ball.

In many previously constructed ball valves, the initial sealing engagement between the resilient seal and the valve ball has been along a single line or narrow band of contact and, as the valve ball moves in the valve under the influence of fluid pressure, the seals yield or deform so that a larger area of the seal engages the surface of the valve ball. As the valve ball moves, the flexible seal not only engages the valve ball over a greater surface area, but also deforms into engagement with the reinforcing member or with the portion of the valve body supporting the flexible seal. When seals constructed in this manner are used, the increasing area of engagement between the seal and the surface of the valve ball greatly increases the friction therebetween, thus requiring a very large force to rotate the valve ball to the open from the closed position, particularly if the valve is closed with a relatively high fluid pressure therein.

Generally, this invention contemplates an improved ball valve including: a body having an inlet, an outlet, and a valve chamber therein between the inlet and outlet; a valve ball mounted in the valve chamber for movement downstream in the valve chamber in response to an increasing pressure differential across the ball when in the closed position; and, an annular, elastic material seal positioned in the downstream end of the valve chamber having an annular seating face thereon facing the valve ball and encircling the outlet, the radial outer edge of the seating face being spaced from the center of the valve ball, when the valve ball is centered in the valve chamber, a distance greater than the radial inner edge of the seating face, whereby the valve ball progressively flexes the seal from the inner toward the outer diameter of the seal as the valve ball moves downstream and the diameter of the area of contact between the valve ball and seal progressively increases as the valve ball moves downstream.

One object of this invention is to provide an improved ball valve that can be easily opened even when the valve is used in a service application involving high fluid pressures.

Another object of the invention is to provide an improved ball valve wherein an improved seal in the valve engages the valve ball substantially along a single line of contact.

A further object of the invention is to provide an improved flexible seal for use in ball valves that is yieldable as the valve ball moves under the influence of a pressure differential thereacross to engage the valve ball along a single line of contact.

Still another object of the invention is to provide an improved seal for use in ball valves that retains the valve ball centered in the valve and flexes, when the valve ball is closed and as the valve ball moves downstream under the influence of pressure, to maintain a fluid tight seal therewith.

One other object of the invention is to provide an improved ball valve that can be easily and economically constructed.

The foregoing and additional objects and advantages of the invention will become more apparent as the following detailed description is read in conjunction with the accompanying drawings wherein like reference characters denote like parts in all views and wherein:

FIG. 1 is a vertical cross-sectional view of a ball valve constructed in accordance with the invention;

FIG. 2 is an enlarged, fragmentary cross-sectional view of a portion of the valve of FIG. 1;

FIGS. 3, 4, 5 and 6 are cross-sectional views similar to FIG. 2, but illustrating the seal in various operational positions;

EMBODIMENT OF FIG. 1

Figure 7:
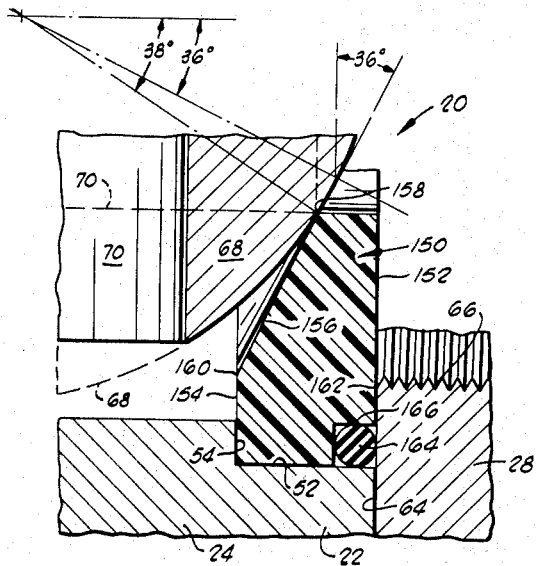
FIG. 7 is an enlarged, fragmentary cross-sectional view similar to FIG. 2, but illustrating another embodiment of seal also constructed in accordance with the invention.

The vertical cross-sectional view of FIG. 1 illustrates a ball valve, generally designated by the reference character 20, that is constructed in accordance with the invention. The ball valve 20 includes a valve body 22 comprising a body member 24 and a pair of flanged connecting members 26 and 28.

The valve body member 24 has a passageway 30 extending therethrough and a transverse opening 32 extending through the wall of the body member 24 intersecting the passageway 30. A counterbore is formed in the opening 32 forming a downwardly facing surface 34 adjacent the intersection between the transverse opening 32 and the passageway 30.

The body member 24 includes an O-ring seal 36 disposed in a recess 38 located in one end thereof and an upstream seal 40 disposed in a counterbore 42. A shoulder 44 that engages the seal 40 is formed in the valve body member 24 by the counterbore 42.

The opposite end of the body member 24 is provided with an O-ring seal 46 disposed in an annular groove 48 and a downstream seal 50 that is disposed in a counterbore 52 in the body member 24. A shoulder 54 that engages the seal 50 is formed in the body member 24 by the counterbore 52.

The upstream connecting member 26 includes an exterior flange 56 and an end face 58 that is in engagement with the upstream end of the body member 24, with the O-ring seal 36, and with the upstream seal 40. A threaded inlet opening 60 extends through the upstream connecting member 26 and is axially aligned with the passageway 30 when the upstream connecting member 26 is assembled with the valve body member 24.

The downstream connecting member 28 includes an exterior flange 62 and an end face 64 thereof that is in engagement with the downstream end of the valve body member 24, with the O-ring seal 46, and with the downstream seal 50. A threaded outlet opening 66 extends through the flanged connecting member and is also axially aligned with the passageway 30 in the valve body member 24.

A valve ball 68, having a flow port 70 extending therethrough, is positioned in the passageway 30. As shown in FIG. 1, the valve ball 68 is centered in a chamber 72 formed in the valve body by the connecting members 26 and 28 and by the valve body member 24. The valve ball 68 is held in the centered position (see FIGS. 1 and 3), when no fluid pressure differential exists therein, by the engagement of the seals 40 and 50 with the exterior surface of the valve ball 68 as will be explained more fully hereinafter.

An elongated slot 74 is formed in the exterior of the valve ball 68 and is sized to receive a rectangular lower end 76 on a valve operating member 78. The slot 74 is sized so that the valve ball 68 can move, when in the closed position, in a direction parallel to the passageway 30 in the body member 24.

The valve operating member 78 extends through the transverse opening 32 and has an exterior flange 80 thereon engaging the surface 34 in the valve body member 24 to limit the upward movement of the valve operating member 78 therein. An O-ring seal 82 is disposed in an annular groove 84 in the valve operating member 78 in sealing engagement with the valve body member 24 in the transverse opening 32.

The end of the valve operating member 78 extending from the valve body 22 is connected with an operating handle 86 by a pin 88. The operating handle 86 includes one or more lugs 90 that are arranged to engage abutments 92 formed on the body member 24 to limit the rotational movement of the operating handle 86, the connected valve operating member 78, and the valve ball 68 to approximately 90 degrees. To hold the valve 20 assembled, a plurality of threaded fasteners 94 extend through the flanges 56 and 62 of the connecting members 26 and 28, respectively. Nuts 96 are threadedly engaged with each end of the fasteners 94 in engagement with the flanges 56 and 62. Rotating the nuts 96 on the fasteners 94, forces the connecting members 26 and 28 relatively together and into engagement with the valve body member 24.

The seals 40 and 50 are identical in construction though oppositely disposed in the valve 20. FIG. 2 illustrates more clearly the structure of the seals 40 and 50. However, only the seal 50 is illustrated therein. Therefore, it will be understood that the seal 40 includes identical portions designated by the same reference characters as used in describing the seal 50.

As shown in FIG. 2, the seal 50 includes an end face 98 that is in engagement with the end face 64 of the downstream connecting member 28. A second end face 100 of the seal 50 is in engagement with the shoulder 54 formed by the counterbore 52 in the body member 24. Although not shown, it will be understood that the distance between the end faces 98 and 100 of the seal 50 is greater than the depth of the counterbore 52 so that the seal 50 is securely retained between the shoulder 54 in the body member 24 and the end face 64 of the downstream connecting member 28 when the ball valve 20 is assembled.

The seal 50 also includes an annular seating face 102 facing the valve ball 68. As illustrated in FIG. 2, the annular seating face 102 is in the form of a truncated cone, that is, the seating face 102 lies in a conical plane. The angle or slope of the cone is equal to the angle between a line projected from the center of the valve ball 68 through the edge formed by the intersection of the flow port 70 with the exterior surface of the valve ball 68 and the center line of the flow port 70. By geometrical similarity, the angle of the annular seating face 102 is the same as the angle between the tangent to the projected line and a plane passed perpendicular to the center line of the flow port 70 when the valve ball 68 is in the open position.

With the particular size of valve ball 68 selected in FIG. 2, the angle of the annular seating face 102 is 38 degrees. The angle of the seating face 102 will always be less than 45 degrees and preferably less than 40 degrees.

The length or extent of the seating face 102 is determined by a radial inner edge 104 that has a diameter substantially equal to the diameter of the flow port 70 in the valve ball 68 and by a radial outer edge 106 that has a diameter not greater than the outlet opening 66 extending through the downstream connecting member 28 and that is at least as long as the flow port 70. It can be observed in FIG. 2, that the radius of the inner edge 104 is less than the radius of the outer edge 106 as measured from the center of the centered valve ball 68.

The seals 40 and 50 are constructed from an elastic material that is compatible with the fluid being handled by the ball valve 20. In the preferred form of the seals 40 and 50, they are constructed from one of the elastic and resilient synthetic resins, such as nylon, Teflon or Delrin.

OPERATION OF THE EMBODIMENT OF FIG. 1

As illustrated in FIG. 1, the ball valve 20 is illustrated in the closed position, that is, the flow port 70 in the valve ball 68 is disposed at a right angle relative to the passageway 30 and the inlet and outlet openings 60 and 66, respectively. Also, the valve ball 68 is illustrated in FIG. 1 as being centered in the chamber 72 in engagement with the seals 40 and 50. If it is desired to open the valve 20, the handle 86 is rotated 90 degrees and, through the connection with the valve operating member 78, the valve ball 68 is also rotated 90 degrees, thereby aligning the flow port 70 in the valve ball 68 with the passageway 30 and the inlet and outlet openings 60 and 66, respectively.

With the valve ball 68 in the closed position as illustrated in FIG. 1, fluid pressure applied to the ball valve 20 through the inlet opening 60 exerts a force on the valve ball 68, moving the valve ball 68 relatively downstream. The movement is possible due to the relative size of the slot 74 in the valve ball 68 and the end 76 of the valve operating member 78 as previously described.

Initially, and if only a relatively low differential pressure exists across the valve ball 68, the valve ball 68 is in engagement with the radial inner edge 104 of the seal 50 as is most clearly illustrated in FIG. 3. In this condition, the line of contact S between the ball 68 and seal 50 is coincident with the inner edge 104.

As the valve ball 68 begins to move toward the outlet opening 66, the downstream seal 50 is deflected (see angle A) about a fulcrum 108, that is located at the engagement between the outer diameter of the outlet opening 66 and the end face 98 of the seal 50. When this occurs, it can be seen that the line of contact S between the valve ball 68 and the annular seating face 102 is shifted from the radial inner edge 104 of the seal 50 toward the radial outer edge 106 thereof. However, it is important to note that the valve ball 68 continues to engage the annular seating face 102 along the single line of contact S or at least along a relatively narrow band or area of engagement. The hardness of the material selected in constructing the seal 50 will determine the precise area of contact between the valve ball 68 and the seal 50 due to some deformation which may occur therein.

As the valve ball 68 continues to move in the downstream direction, it can be seen in FIG. 5 that the line of contact S between the valve ball 68 and the seal 50 continues to move from the radial inner edge 104 of the annular seating face 102 toward the radial outer edge 106 thereof. The additional outward movement of the line of contact S is due to the deflection of the seal 50 through the angle A, which as can be clearly seen in FIG. 5 is greater than the angle A illustrated in FIG. 4. The change in the angle A is produced as the seal 50 deflects about the fulcrum 108 located at the juncture between the end face 98 of the seal 50 and the outlet opening 66 in the flanged connecting member 28.

FIG. 6 illustrates the extreme downstream position of the valve ball 68 and it can be seen therein that the line of contact S between the valve ball 68 and the seal 50 is very close to or coincident with the radial outer edge 106 of the seating face 102. Again, the diameter of the line of contact S between the valve ball 68 and the seal 50 has increased due to the deflection of the seal 50. The magnitude of the angle A produced as the seal 50 deflects about the fulcrum 108 is again enlarged as compared to the angle A as shown in FIG. 5.

From the foregoing, it can be perceived that the engagement between the valve ball 68 and the downstream seal 50 is along a single line or, at least, along a very narrow band of contact. Thus, if it is desired to rotate the valve ball 68 to the open position, as previously described, very little frictional resistance is produced by the downstream seal 50. Thus, the valve ball 68 may be easily rotated to the open position from the closed position even though a relatively high differential pressure may exist across the valve ball 68.

Manifestly, as the differential in pressure across the valve ball 68 decreases the resiliency of the material used in constructing the downstream seal 50 returns the valve ball 68 to the centered position illustrated in FIGS. 1 and 3. Furthermore, the valve 20 with the seals 40 and 50 located therein as shown in FIG. 1, can be used effectively regardless of whether the differential across the valve ball 68 is as described or is from the outlet opening 66 to the inlet opening 60.

EMBODIMENT OF FIG. 7

The fragmentary cross-sectional view of FIG. 7 illustrates another embodiment of flexible seal, generally designated by the reference character 150, located in the ball valve 20. As shown therein, the seal 150 is located in the counterbore 52 and includes an end face 152 that is in engagement with the end face 64 of the downstream connecting member 28. A second end face 154 on the seal 150 is in engagement with the shoulder 54 formed by the counterbore 52 in the body member 24. As mentioned with respect to the seals 40 and 50 of FIG. 1, the distance between the end faces 152 and 154 of the seal 150 is greater than the length of the counterbore 52 so that the seal 150 is securely retained in the valve body 22.

The seal 150 also includes a seating face 156 that generally faces the valve ball 68. As illustrated in FIG. 7, the seating face 156 is disposed at an angle of 36 degrees.

As can be seen therein, a radial inner edge 158, defining the innermost extent of the seating face 156 is determined by passing a line from the center of the valve ball 68 through the edge of the flow port 70 when the valve ball 68 is in the open position (as shown in dash lines) and centered so that the radial inner edge 158 is no smaller in diameter than the port 70. For the size ball 68 selected in FIG. 7, the angle of the line passing through the edge of the flow port 70 through the center line of the valve ball 68 remains 38 degrees as mentioned with respect to the valve ball 68 of FIG. 1 even though the selected angle for the seating face 156 is only 36 degrees.

A radial outer edge 160 defines the outermost extent of the seating face 156. As can be appreciated from comparing FIGS. 3 and 7, the seating face 156 is larger than the seating face 102 due to the smaller angle (36° as compared to 38°) of the seating face as previously mentioned.

Reducing the angle of the seating face 156 serves to more definitely create the single line or very narrow band of engagement between the seating face 156 and the surface of the valve ball 68. Also, the greater length of the seating face 156 reduces the effective thickness of the seal 150, that is, the thickness of that portion which deforms or deflects about a fulcrum 162 as the seal 150 is deflected by the downstream movement of the valve ball 68.

An O-ring seal 164 is located in an annular recess 166 formed in the end face 152 of the seal 150. The O-ring seal 164 sealingly engages the body member 24, the downstream connecting member 28 and the seal 150 to effectively prevent fluid flow therebetween.

It should be readily apparent that the seal 150, when installed in the ball valve 20, functions in the same manner as did the seal 50 previously described in connection with FIG. 1. However, and as previously pointed out, the seal 150 with its smaller angle of seating face produces a more narrow band of contact between the seal 150 and the exterior surface of the valve ball 68 and, therefore, reduces the friction therebetween during rotation of the valve ball 68 between the open and closed positions.

EMBODIMENT OF FIG. 8

Figure 8:
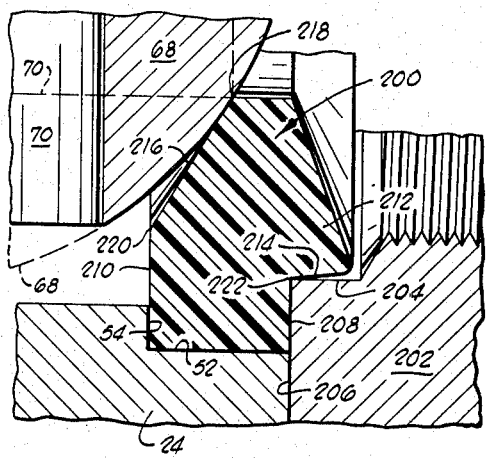
FIG. 8 is an enlarged, fragmentary cross-sectional view similar to FIG. 2, but illustrating still another embodiment of seal that is also constructed in accordance with the invention.

The fragmentary cross-sectional view of FIG. 8 illustrates another embodiment of flexible seal generally designated by the reference character 200. The flexible seal 200 is illustrated as being disposed in the counterbore 52 of the valve body member 24. When using the seal 200, it is necessary to modify the downstream connecting member 28. As modified, the connecting member is designated by the reference character 202. The modification to the connecting member 202 includes the provision of a counterbore 204 in an end face 206 thereof. The end face 206 of the connecting member 202 is in engagement with the downstream end of the valve body member 24.

The seal 200 includes an end face 208 that is in engagement with the end face 206 of the connecting member 202 and an end face 210 that is in engagement with the shoulder 54 formed by the counterbore 52 in the valve body member 24. The distance between the end faces 208 and 210 of the seal 200 is greater than the depth of the counterbore 52 so that the seal 200 is securely retained in the counterbore 52 by the engagement of the end faces 208 and 210 with the connecting member 202 and the shoulder 54, respectively.

Also, the seal 200 includes an annular protuberance 212 on the end face 208. The protuberance 212 projects into the counterbore 204 and as illustrated, has a peripheral surface 214 disposed at an angle relative to the counterbore 204 for purposes that will be described hereinafter. As is readily apparent in FIG. 8, the provision of the protuberance 212 on the seal 200 increases the thickness of the seal 200, but does not increase the force required to deflect the seal 200 as the valve ball 68 moves downstream.

The seal 200 also includes an annular seating face 216 that generally faces the valve ball 68. The seating face 216 is disposed at an angle as previously described in connection with FIGS. 1 and 7 and is defined by a radial inner edge 218 and a radial outer edge 220. As previously mentioned, the radial inner edge 218 is determined by the projection of a line from the center of the valve ball 68 through the edge of the flow port 70 in the valve ball 68 when the valve ball 68 is disposed in a centered, open position as illustrated by the dash lines in FIG. 8.

With the valve ball 68 in the closed position, and a pressure differential existing thereacross, the ball valve 68 moves downstream, engaging the seal 200 on a line of contact having a progressively increasing diameter as described in connection with FIG. 1, deflecting the seal 200 relatively toward the downstream connecting member 202 and about a fulcrum 222. The fulcrum 222 is the point of engagement between the peripheral surface 214 of the protuberance 212 with the end face 206 of the connecting member 202.

The downstream movement of the valve ball 68 continues as the pressure differential thereacross increases until the peripheral surface 214 fully engages the connecting member 202 in the counterbore 204. When this occurs, the deflection of the seal 200 stops and the valve ball 68 is prevented from farther downstream movement therein.

While the seal 200 retains its flexibility as compared with either the seal 50 or the seal 150, the provision of the protuberance 212 thereon provides a means of resisting deflection of the seal 200 after a predetermined travel of the valve ball 68 has occurred. Thus, the seal 200 may be more satisfactorily used if it is anticipated that extremely high differential pressures will occur across the ball valve 68. It should also be emphasized that the contact between the valve ball 68 and seal 200 occurs along a single line or narrow band as previously described.

EMBODIMENT OF FIG. 9

Figure 9:
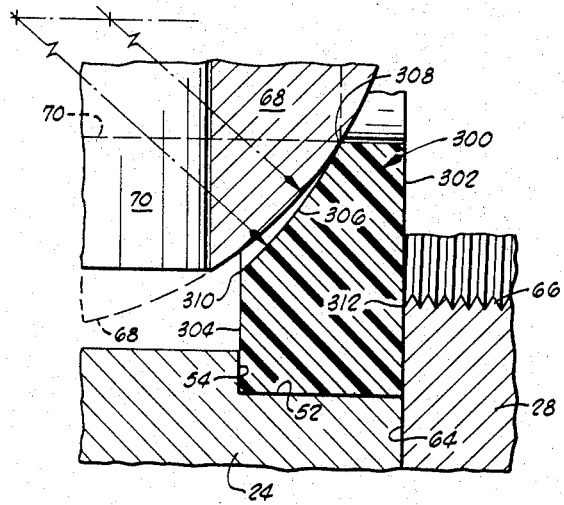
FIG. 9 is an enlarged, fragmentary cross-sectional view similar to FIG. 2 but illustrating a further embodiment of seal that is also constructed in accordance with the invention; and, FIG. 10 is an enlarged, fragmentary cross-sectional view similar to FIG. 2, but illustrating an additional embodiment of seal that is also constructed in accordance with the invention.

The embodiment of seal illustrated in the fragmentary cross-sectional view of FIG. 9 is generally designated by the reference character 300 and is also constructed in accordance with the invention. As illustrated therein, the seal 300 is located in the counterbore 52 of the body member 24.

The seal 300 includes an end face 302 that is in engagement with the end face 64 of the downstream connecting member 28 and an end face 304 that is in engagement with the shoulder 54 in the valve body member 24.

An annular seating face 306 on the seal 300 is defined by a radial inner edge 308 and a radial outer edge 310. The inner and outer edges 308 and 310 are located on the seating face 306 as described in connection with the previously described seals.

As illustrated, the sealing face 306 has the configuration of a zone of a sphere. The center of the sphere defining the seating face 306 is located on the center line of the flow port 70 in the valve ball 68 when the valve ball 68 is positioned in the open position as illustrated by the dash lines in FIG. 9. The radius of the sphere is somewhat larger than the radius of the valve ball 68 thus assuring that the seating face 306 of the seal 300 engages the valve ball 68 along a single line of contact, that is, along the radial inner edge 308, when the valve ball 68 is centered as previously described in connection with the other embodiments of seal.

The operation of the seal 300 is identical to the operation of the seals previously described in connection with FIGS. 1 and 7. For example, downstream movement of the valve ball 68, when in the closed position and a differential pressure is exerted thereon, deflects the seal about a fulcrum 312 that is located at the juncture between the end face 302 of seal and the outlet opening 66 in the downstream connecting member 28.

As the valve ball 68 moves downstream, the engagement between the exterior surface of the valve ball 68 and the seating face 306 is along a single line of contact or along a relatively narrow area or band of engagement as previously described. Thus, it can be appreciated that the seal 300, while having a slightly different configuration of the seating face 206, provides the advantages previously described in connection with FIGS. 1 and 7.

EMBODIMENT OF FIG. 10.

Figure 10:
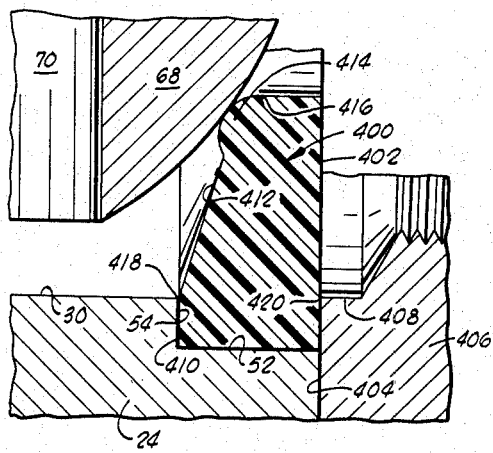

FIG. 10 illustrates another embodiment of seal generally designated by the reference character 400 and also constructed in accordance with the invention. As illustrated therein, the seal 400 is installed in the counterbore 52 of the valve body member 24.

An end face 402 on the seal 400 is in engagement with an end face 404 of a downstream connecting member 406. As illustrated, the downstream connecting member 406 includes a counterbore 408 that is of substantially the same diameter as the passageway 30 extending through the valve body member 24.

An end face 410 on the seal 400 is in engagement with the shoulder 54 in the valve body member 24. The distance between the end faces 402 and 410 of the seal 400 is slightly greater than the depth of the counterbore 54 so that the seal 400 is securely clamped in the counterbore 52.

The seal 400 also includes a seating face 412 generally facing the valve ball 68 and constructed at an angle as previously described in connection with the other embodiments of seals. However, it should be pointed out that the seal 412 includes an annular bead 414 extending along the radial inner edge 416 thereof. The annular bead 414 is provided to insure the initial sealing engagement between the seal 400 and the exterior surface of the valve ball 68.

The length or extent of the seating face 412 is defined on its outermost portion by a radial outer edge 418 that has a diameter substantially equal to the diameter of the passageway 30. It can be appreciated from viewing FIG. 10 that the flexibility of the seal 400 is greater than the flexibility of the previously described seals due to the enlargement of the counterbore 408 in the downstream connecting member 406 so that a fulcrum 420 is located near the outermost periphery of the seal 400.

With a differential pressure existing across the valve ball 68, the valve ball 68 moves downstream in the valve body member 24. As the valve ball 68 moves downstream, the seal 400 is deflected about the fulcrum 420 until the exterior surface of the valve ball 68 engages with the seating face 412. At some point during the downstream movement of the valve ball 68, the exterior surface thereon will be in engagement with both the annular bead 414 and the seating face 412 thus providing a pair of parallel, spaced lines of contact with the seal 400 to provide a highly effective downstream seal therein.

Continued downstream movement of the valve ball 68, deflects the seal 400 until the annular bead 414 is moved out of engagement with the surface of the valve ball 68. When this occurs, the exterior surface of the valve ball 68 is in engagement only with the seating face 412, thus providing the single line or narrow band of contact between the valve ball 68 and the seal 400 as previously described in connection with the other embodiments of seal.

As may be realized from viewing FIG. 10, the furthest downstream movement of the valve ball 68 places the exterior surface thereof in engagement with the seating face 412 along the single line of engagement with the seating face 412 so that the friction therebetween is reduced to the minimum when the highest differential pressure is acting on the valve ball 68. Thus, the ball 68 can be rotated from the closed to the open position with the least friction when the highest pressure force is exerted thereon. It can be appreciated that the seal 400 also provides the advantages described in connection with the embodiments of FIGS. 1, 7 and 9 and in addition provides a greater degree of flexibility in the seal.

From the foregoing detailed descriptions of the various embodiments of seals constructed in accordance with the invention, it can be appreciated that each embodiment described provides a means of reducing the frictional engagement between the valve ball and the seating face of the seal so that the valve ball can be rotated from the closed position to the open position with relatively little effort even though an extremely high pressure differential may exist across the valve ball. Also, the seals described hereinbefore may be constructed from relatively rigid material to withstand the load exerted by the valve ball and yet have sufficient flexibility to move downstream with the valve ball to maintain the low frictional engagement. The seals are constructed with sufficient elasticity to return into their initial position when the differential pressure no longer exists across the valve ball.

It will be understood that the embodiments described herein are presented by way of example only and that many modifications and changes can be made thereto without departing from the spirit of the invention or from the scope of the annexed claims.

What I claim is:

1. A ball valve, comprising:
   a body having an inlet and an outlet and a valve chamber therein between the inlet and outlet;
   a valve ball mounted in the valve chamber for movement downstream in the valve chamber, when in a closed position, in response to increasing pressure differential across the ball; and,
   an annular, elastic material seal positioned in the downstream end of the valve chamber having an annular seating face thereon facing the valve ball and encircling said outlet, the radial inner edge of said seating face having a diameter less than the diameter of said outlet, the radial outer edge of said seating face being spaced from the center of the valve ball, when the valve ball is centered in the valve chamber, a distance greater than the radial inner edge of said seating face and having an outer diameter no greater than the diameter of said outlet, whereby the valve ball progressively deflects the seal into said outlet from the inner toward the outer diameter of the seal as the valve ball moves downstream and the diameter of the area of contact between the valve ball and seal progressively increases as the valve ball moves downstream.

2. A ball valve as defined in claim 1 wherein said seal is positioned with the inner edge of said seating face in engagement with the valve ball when the valve ball is centered in the valve chamber.

3. A ball valve as defined in claim 1 wherein said seating face is shaped in the form of a frustum of a cone.

4. A ball valve as defined in claim 1 wherein said seating face is shaped in the form of a zone of a sphere having a radius greater than the radius of said ball and having a center spaced from the center of said ball, the inner edge of said seating face being in engagement with said ball when said ball is centered in said chamber.

5. A ball valve as defined in claim 1 wherein said seating face includes a bead formed around the inner edge thereof positioned to engage the valve ball when the valve ball is centered in the valve chamber.

6. A ball valve as defined in claim 1 wherein the valve ball has a port therethrough, said seating face is conically shaped, and wherein the angle of the seating face with respect to a transverse plane through the seal is no greater than the angle between the center line of the valve ball port and a line extending from the center of the ball to an edge of the valve ball port.

7. A ball valve as defined in claim 6 wherein said angle of the seating face is less than the angle between the center line of the valve ball port and a line extending from the center of the valve ball to an end edge of the port.

8. A ball valve as defined in claim 7 wherein said angle is less than 45 degrees.

9. A ball valve as defined in claim 7 wherein said angle is less than 40 degrees.

10. A ball valve as defined in claim 1 wherein the seal is formed of a synthetic resin material.

11. A ball valve, comprising:
    a body having an inlet and an outlet and the valve chamber therein between said inlet and outlet, wherein the diameter of the chamber is greater than the diameter of the outlet to provide a circumferential shoulder facing said inlet in the end of the chamber adjacent said outlet;
    a valve ball mounted in the valve chamber for movement in the valve chamber toward said inlet and outlet when in a closed position in response to increasing pressure differential across the ball, said ball having a port therethrough of a length no greater than the diameter of the outlet; and,
    an annular, elastic material seal positioned in the valve chamber against said circumferential shoulder having an inner diameter less than the diameter of said outlet and a seating face thereon facing the valve ball, the inner diameter of said seating face being no less than the diameter of said port and the outer diameter of said seating face being no less than the length of the port through the valve ball, the radial outer edge of said seating face being spaced from the center of the valve ball, when the valve ball is centered in the valve chamber, a distance greater than the radial inner edge of said seating face, whereby the valve ball progressively deflects the seal from the inner toward the outer diameter of the seal as the valve ball moves toward said outlet and the diameter of the area of contact between the valve ball and seal progressively increases as the valve ball moves toward said outlet.

12. The ball valve of claim 11 wherein said valve outlet has a counterbore therein adjacent the intersection between said outlet and chamber, said counterbore having a diameter not greater than the diameter of said chamber.

13. The ball valve of claim 12 wherein said annular elastic material seal has an annular protuberance on the opposite side thereof to said seating face projecting into said counterbore, said annular protuberance being engageable with the valve body when said seal is deflected by said valve ball to prevent farther deflection of said seal.

14. The ball valve of claim 11 wherein said valve body has an annular recess therein adjacent said circumferential shoulder forming a shoulder in said valve body facing said outlet, and wherein said seal is disposed in said annular recess in engagement with said shoulders, whereby said seal is retained in said valve body.

15. The ball valve of claim 14 wherein said chamber is larger in diameter than said inlet providing a second circumferential shoulder facing said outlet in the end of said chamber adjacent said inlet, and also includes a second annular, elastic material seal positioned in said chamber against said second circumferential shoulder, said second annular elastic material seal being constructed identically to said first mentioned seal, whereby the valve ball progressively deflects said second annular, elastic seal from the inner toward the outer diameter of the seal as the valve ball moves toward said inlet and the diameter of the area of contact between said valve ball and said second annular, elastic material seal progressively increases as the valve ball moves toward said inlet.

16. A ball valve comprising:
    a body including
        a body member having a pair of end faces, a passageway extending therethrough, and a counterbore in each end of said passageway,
        an inlet connecting member having an end face engaging one of the end faces on said body member and having an inlet opening extending therethrough, said inlet opening being aligned with and of smaller diameter than said passageway, and
        an outlet connecting member having an end face engaging the other end face on said body member and having an outlet opening extending therethrough, said outlet opening being aligned with and of smaller diameter than said passageway, said inlet and outlet connecting members cooperating with said body member to form a chamber in said body;

a valve ball mounted in the chamber for movement along said passageway toward and away from said connecting members in response to pressure differentials across said ball when in a closed position, said ball having a port therethrough of a length no greater than the diameter of said inlet and outlet openings; and, a pair of annular, elastic material seals positioned in said chamber, one of said seals being disposed in the counterbore adjacent said outlet connecting member and the other being disposed in the counterbore adjacent said inlet connecting member, each of said seals having an unstressed length greater than length of said counterbore, whereby said seals tightly engage said valve body member and the adjacent connecting member when said valve is assembled, an annular seating face facing said valve ball, said seating face being defined by a radial inner edge having a diameter no less than the diameter of said port and by a radial outer edge having a diameter no less than the length of the port extending through the valve ball, the radial outer edge being farther from the center of the valve ball than the radial inner edge when the valve ball is centered in the chamber, said valve ball moving toward said inlet or outlet opening progressively deflecting the seal located in the path of said ball, whereby the diameter of the area of contact between the valve ball and seal progressively increases as said valve ball continues its movement.

References Cited
UNITED STATES PATENTS

| | | | |
|---|---|---|---|
| 2,945,666 | 7/1960 | Freeman | 251—172 |
| 2,963,263 | 12/1960 | Sanctuary | 251—315 X |
| 2,989,990 | 6/1961 | Bass | 251—172 X |
| 3,016,062 | 1/1962 | Zinniger | 251—315 X |
| 3,030,068 | 4/1962 | Priese | 251—315 X |
| 3,047,007 | 7/1962 | Lunken | 251—315 X |
| 3,146,988 | 9/1964 | Riopelle | 251—315 |

FOREIGN PATENTS 567,554    12/1958    Canada.

CLARENCE R. GORDON, *Primary Examiner.*